US008631658B2

(12) United States Patent
MacAdam et al.

(10) Patent No.: US 8,631,658 B2
(45) Date of Patent: Jan. 21, 2014

(54) METHOD AND SYSTEM FOR ENHANCING POWER OUTPUT OF RENEWABLE THERMAL CYCLE POWER PLANTS

(75) Inventors: Scott MacAdam, Bartlesville, OK (US); Roger E. Anderson, Gold River, CA (US); Keith L. Pronske, Wilton, CA (US)

(73) Assignee: Clean Energy Systems, Inc., Rancho Cordova, CA (US)

( * ) Notice: Subject to any disclaimer, the term of this patent is extended or adjusted under 35 U.S.C. 154(b) by 992 days.

(21) Appl. No.: 12/381,278

(22) Filed: Mar. 9, 2009

(65) Prior Publication Data

US 2010/0146970 A1 Jun. 17, 2010

Related U.S. Application Data

(60) Provisional application No. 61/068,583, filed on Mar. 7, 2008.

(51) Int. Cl.
*F02C 3/30* (2006.01)
*F01K 7/34* (2006.01)

(52) U.S. Cl.
USPC ............ 60/775; 60/39.48; 60/39.59; 60/653; 60/677; 60/679

(58) Field of Classification Search
USPC ............... 60/775, 39.48, 39.49, 39.53, 39.55, 60/39.59, 653, 677–679
See application file for complete search history.

(56) References Cited

U.S. PATENT DOCUMENTS

| 2,969,637 | A |  | 1/1961 | Rowekamp |  |
|---|---|---|---|---|---|
| 4,057,964 | A |  | 11/1977 | Hutchinson |  |
| 4,164,848 | A | * | 8/1979 | Gilli et al. | 60/652 |
| 4,866,928 | A | * | 9/1989 | Raiko | 60/775 |
| 5,564,269 | A | * | 10/1996 | Briesch | 60/775 |
| 5,761,896 | A | * | 6/1998 | Dowdy et al. | 60/775 |
| 5,956,937 | A |  | 9/1999 | Beichel |  |
| 6,000,211 | A | * | 12/1999 | Bellac et al. | 60/775 |
| 2004/0128975 | A1 |  | 7/2004 | Viteri |  |
| 2005/0229603 | A1 | * | 10/2005 | Yamada et al. | 60/775 |
| 2009/0136337 | A1 | * | 5/2009 | Boss et al. | 415/145 |

FOREIGN PATENT DOCUMENTS

| WO | WO 97-31184 | 8/1997 |
|---|---|---|
| WO | WO 99-22127 | 5/1999 |
| WO | WO 01-75277 | 10/2001 |

\* cited by examiner

*Primary Examiner* — Hoang Nguyen

(74) *Attorney, Agent, or Firm* — Heisler & Associates

(57) ABSTRACT

A steam reheat process is provided to enhance a thermal power cycle, and particularly a renewable steam thermal cycle. An oxyfuel combustion gas generator is provided which combusts a hydrogen and/or carbon containing fuel with an oxidizer of primarily oxygen to generate products of combustion including steam and/or carbon dioxide. Water from the thermal cycle is directed to the reheater for mixing with the products of combustion within the reheater to generate a working fluid containing steam. This steam is routed through a turbine or other expander and power is outputted from the system. The water is optionally thereafter condensed and at least partially routed back to the thermal cycle. Any carbon dioxide within the working fluid can be separated in a condenser downstream of the expander for capture of the carbon dioxide, such that increased power output for the thermal power cycle is achieved without atmospheric emissions.

23 Claims, 3 Drawing Sheets

SCHEMATIC OF STEAM REHEAT PROCESS, WITHOUT CO₂ CAPTURE

METHOD AND SYSTEM FOR ENHANCING POWER OUTPUT OF RENEWABLE THERMAL CYCLE POWER PLANTS

CROSS-REFERENCE TO RELATED APPLICATIONS

This application claims benefit under Title 35, United States Code §119(e) of U.S. Provisional Application No. 61/068,583 filed on Mar. 7, 2008. This application also incorporates by reference the entire contents of U.S. Pat. Nos. 5,956,937; 6,206,684; 6,945,029 and 7,043,920.

FIELD OF THE INVENTION

The following invention relates to oxyfuel combustion power generation systems to combust an oxidizer of primarily oxygen with a fuel containing hydrogen and/or carbon to generate a working fluid of steam and/or carbon dioxide and beneficially use the working fluid to output power. More particularly, this invention relates to systems and methods for using an oxyfuel combustion reheater with a thermal cycle working fluid, at last partially of water, to enhance power output from such a thermal cycle power plant through use of the oxyfuel combustor and at least one additional turbine, or other expander, to enhance the overall power output with low or zero output of carbon dioxide or other pollutants and while enhancing power output and efficiency of the overall power generation system.

BACKGROUND OF THE INVENTION

To minimize air pollution from power plants and to reduce dependence on fossil fuels, some power plants that are considered to provide "renewable" energy have enjoyed increased popularity in recent years. Renewable energy is a category of power generation sources that primarily includes solar power, wind power, geothermal power and biomass power (including various different non-fossil solid fuels as a starter material). While mature non-fossil and non-polluting technology such as nuclear power and hydroelectric power generally avoid combustion of and depletion of fossil fuels in their use, these mature technologies are generally not considered to be in this "renewable" power generation category.

Renewable energy is often incentivized by various government and electric utility sponsored programs to make renewable energy more economically viable and to increase the utilization of such technology to provide electric power to the "grid" for consumption. Hence, it is generally desirable for those in the power generation market to deploy as much renewable electric power as possible.

Some of these renewable energy technologies still utilize a thermal cycle (typically a Rankine cycle) for power generation. In such a thermal cycle, it is necessary to pump a working fluid to an elevated pressure and then heat that working fluid to cause the working fluid to boil. This working fluid (typically water/steam) can be kept at a boiling point, in which case it is referred to as "saturated" steam or can also be referred to as "wet" steam. If additional heat is added to elevate the temperature above the boiling point, the steam is referred to as "superheated steam." The working fluid is then routed through an expander, typically a steam turbine.

Steam turbines exhibit greatest efficiency generating power from higher temperature working fluids. State of the art steam turbines can handle an inlet temperature for the elevated pressure steam or other working fluid of at least 800° F., and typically as high as 1050-1200° F. Some experimental steam turbines have even operated at higher temperatures.

Renewable energy systems that utilize a heated working fluid typically include geothermal power plants, biomass power plants and solar thermal power plants. Solar thermal power plants are different from photovoltaic power plants in that the solar radiation is not used directly to generate electricity, but rather is utilized indirectly to heat water or some other working fluid. This heated water or other working fluid is then caused to boil and be expanded through a turbine to generate power.

Often such solar thermal power plants, geothermal power plants and biomass power plants each suffer from a common problem of not having sufficient heat available to raise the temperature of the working fluid (typically water) to a superheated temperature, and most preferably a temperature near a maximum inlet temperature that can be handled by the steam turbine. As a result, such renewable power generation systems exhibit significantly less efficiency than could otherwise be attained. This deficiency means that less power is generated from such renewable sources than the amount of power theoretically available from the renewable source.

Accordingly, a need exists for power generation processes which can take the wet steam, saturated steam or only slightly superheated steam from a source, such as a heated working fluid based renewable power plant and to raise the temperature of the working fluid up to an optimal temperature matching a maximum inlet temperature for the steam turbine. With such a system, higher efficiency and hence more power can be produced by the power plant. Such a steam reheater would benefit from having little or no atmospheric emissions of pollutants and possibly using renewable fuels.

SUMMARY OF THE INVENTION

With this invention a system and method are provided for enhancing power output and efficiency of a thermal cycle power plant, and particularly a renewable thermal cycle power plant. The thermal cycle power plant includes a source of heat that is preferably renewable that heats a working fluid, typically containing water, to an elevated temperature. This elevated temperature water is routed at least indirectly to an oxyfuel combustion reheater.

The reheater includes an inlet for an oxidizer that is primarily oxygen and an inlet for a fuel which contains carbon and/or hydrogen. The reheater also includes a water inlet for receipt of the elevated temperature water from the thermal cycle. The fuel and oxygen are combusted together within the reheater to generate products of combustion including steam and/or carbon dioxide which is then combined with the water from the water inlet to generate a working fluid of steam and/or carbon dioxide.

The working fluid from the reheater is routed to a turbine or other expander where the working fluid has its pressure and temperature reduced and power is outputted. This can be the sole source of output power for the system. As an alternative, at least one turbine can be included within the thermal cycle upstream of the water inlet into the reheater, such that the turbine downstream of the reheater provides one of multiple turbines or other expanders outputting power from the overall system. The turbine downstream of the reheater discharges water and/or carbon dioxide. Most preferably, this discharged working fluid including water and/or carbon dioxide is next routed to a condenser.

The condenser condenses at least a portion of the water in the working fluid into a liquid state. With the carbon dioxide remaining within the condenser in a gaseous state, the carbon dioxide can be easily separated from the water. A liquid water outlet can optionally be routed back to the thermal cycle, such as to a feedwater pump upstream of the source of heat within the thermal cycle. The carbon dioxide separated as a gas from the condenser can optionally be collected for storage away from the atmosphere, such as by injection into oil wells for enhanced oil recovery, within other geological formations either merely for storage away from the atmosphere or for resource extraction. By collecting and storing the carbon dioxide away from the atmosphere, the system remains overall carbon neutral, even when a fossil fuel is combusted in the reheater.

The turbine can be a steam turbine with an outlet temperature close to a saturation temperature for steam, or can be a gas turbine with an outlet temperature elevated above the saturation temperature for steam or, the turbine could be in the form of some other form of expander, such as a piston expander, and still also be configured to output power. If the steam is discharged from the turbine above a condensation temperature, a heat recovery steam generator can be provided downstream of the turbine or other expander. The heat recovery steam generator is configured to transfer heat to a bottoming cycle working fluid for further power generation and/or to merely generate process heat as part of an overall cogeneration plant. The heat recovery steam generator also preferably condenses the water into a liquid state and keeps any carbon dioxide within the working fluid in a gaseous state for removal of the carbon dioxide separate from the water.

OBJECTS OF THE INVENTION

Accordingly, a primary object of the present invention is to provide a method for enhancing efficiency of a thermal cycle power plant, and especially an at least partially renewable thermal cycle power plant, such as a solar, geothermal or biomass power plant.

Another object of the present invention is to provide a carbon neutral method for enhancing efficiency and power output of a thermal cycle power plant, and especially a renewable power plant.

Another object of the present invention is to provide a carbon neutral power generation system.

Another object of the present invention is to provide a method for increasing power output from a renewable thermal cycle power plant.

Another object of the present invention is to provide a retrofit kit for modification of a renewable thermal cycle power plant to enhance power output and efficiency from the power plant in a potentially carbon neutral, or even potentially carbon negative manner.

Another object of the present invention is to provide a method and system for enhancing power output from a Rankine cycle power plant without increasing emissions into the atmosphere.

Another object of the present invention is to provide a method and system for enhancing the power output of a solar thermal power plant in a manner that is carbon neutral and potentially also renewable.

Another object of the present invention is to provide a method and system for enhancing the power output of a geothermal power plant in a manner that is carbon neutral and potentially also renewable.

Another object of the present invention is to provide a method and system for enhancing the power output of a biomass power plant in a manner that is carbon neutral and potentially also renewable.

Other further objects of the present invention will become apparent from a careful reading of the included drawing figures, the claims and detailed description of the invention.

DESCRIPTION OF THE PREFERRED EMBODIMENT

Figure 1:
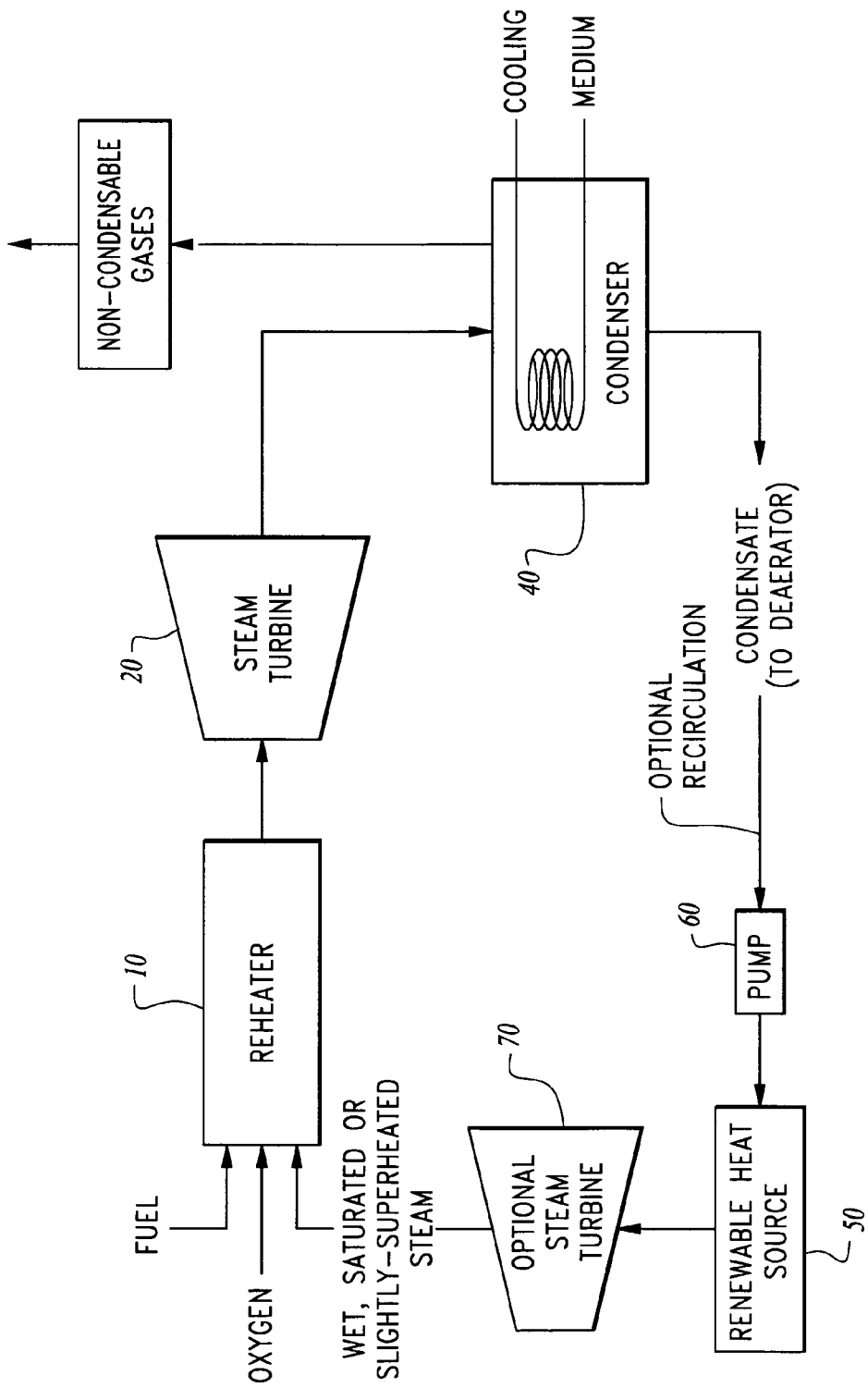
FIG. 1 is a schematic of one form of steam reheat process for addition to a thermal cycle power plant to enhance power output therefrom, this embodiment showing the process without carbon dioxide capture.

Referring to the drawings, wherein similarly labeled items correspond with the written description herein throughout this description, a reheater 10 is depicted in the form of an oxyfuel combustion device combusting an oxidizer of primarily oxygen with a fuel containing carbon and/or hydrogen. The reheater 10 is beneficially added to a thermal cycle, such as a Rankine cycle power plant, to add additional heat to water within the thermal cycle power plant to enhance power output and efficiency of the power plant, and in a manner that does not have any atmospheric emissions, is carbon neutral (or even carbon negative) and is potentially renewable. The thermal cycle is located upstream of the steam inlet into the reheater. When "steam" is mentioned, it is meant to refer to water in a gaseous or liquid or combined gas and liquid state.

The reheater 10 of this invention is, in a preferred embodiment, similar to oxyfuel combustion gas generators developed by Clean Energy Systems, Inc. of Rancho Cordova, Calif., such as described in U.S. Pat. Nos. 5,956,937; 6,206,684; 6,945,029; and 7,043,920; each of which patents are incorporated herein by reference. The purpose of a reheater 10 is to directly heat a source of steam or combined steam and carbon dioxide by combustion of fuel with oxygen and combining the combustion products with the cooler steam from the thermal cycle. The combined heated steam mixture or steam and carbon dioxide mixture is then used as a high temperature working fluid for a steam turbine 20 or a modified gas turbine 30. This boosts the overall efficiency of the plant, especially if high reheat temperatures are attained. Possible applications where an oxyfuel reheater 10 could be used according to this invention to reheat wet, saturated or slightly superheated steam from various sources to increase the power output and efficiency of a power plant, are disclosed herein.

As shown in FIG. 1, the core of the reheat process of this invention is an oxyfuel combustion reheater 10 which burns a fuel with oxygen to directly generate a high temperature working fluid of steam and typically also carbon dioxide. For instance, if the fuel is hydrogen, the reheater 10 would generate water by combustion of oxygen and also heat the wet, saturated or superheated steam entering the reheater 10. In such a case, the working fluid discharged would be substantially only steam. If the fuel contains carbon the working fluid would be a mixture of steam and carbon dioxide. The ratio of steam and carbon dioxide to each other varies based on the amount of carbon in the fuel. The turbine 20 or other expander preferably is designed to exhibit optimum performance for the expected steam/CO2 ratio, but also preferably is sufficiently flexible that the fuel can vary in carbon content and not damage the turbine 20.

If beneficial, the flow rate of steam into the reheater 10 can be varied or other inputs into the reheater 10 can be varied to control the steam/CO2 if turbine 20 performance diminishes when CO2 exceeds a design amount, and a high carbon fuel is to be combusted, flow rate of steam into the reheater 10 can be increased and/or the flow of combustion reactants into the reheater 10 can be reduced. The amount of CO2 in the working fluid would thus be reduced. If it is desired to increase the CO2 in the working fluid, the opposite steps can be taken.

This heated working fluid then enters an expander, such as a steam or gas turbine 20, 30, to generate power. The inlet temperature for this turbine 20, 30 would preferably match the maximum design inlet temperature for the turbine 20, 30 to maximize power output. This maximum inlet temperature can also vary depending on the amount of CO2 in the working fluid so that the maximum temperature for the particularly composed working fluid is preferably matched for maximum power output and efficiency.

The turbine 20, 30 exhaust preferably then enters a condenser 40 that is cooled with cooling water, air, or other cooling media, and the non-condensable fraction, comprising mainly CO2, is removed. The CO2 can be beneficially used and/or sold, sequestered from the atmosphere, or vented to the atmosphere, depending on the desires of the plant operator. The condenser 40 can also be used to raise steam or otherwise boil a working fluid in a bottoming cycle, such as described in conjunction with the embodiment of FIG. 3 below.

If the condenser 40 is operated at sub-atmospheric pressures, as is typically the case, the non-condensables are compressed via a steam ejector, liquid ring vacuum pump, or similar compression device. The condensate from the condenser 40 (primarily water) is deaerated and optionally returned to the heat source 50 that raises the lower-temperature steam, as part of the thermal cycle upstream of the steam inlet into the reheater 10. For instance, if the steam source is a geothermal vent, the water/condensate can be returned to the vent where it will again be heated into steam before returning to the reheater 10, either directly or through heat exchangers. If the steam source is a solar radiation concentrating boiler, the water can be routed, typically by way of a feedwater pump 60, to the boiler inlet of the solar radiation boiler. If the steam source is a biomass combustion boiler, the water/condensate could be routed by way of a feedwater pump 60 into the boiler of that system.

The reheater 10 may be fired with fuels that include: natural gas; hydrogen; hydrogen-rich gas; synthesis gas (often referred to as syngas and typically being in large portion a mixture of hydrogen gas, carbon monoxide gas and carbon dioxide gas) derived from coal, coke, biomass; oil/water emulsions; fuel/water slurries; and liquid fuels such as glycerine or alcohols. If the fuel is a renewable fuel, the entire power plant remains classified as renewable. Examples of renewable fuels include biomass, landfill gas, glycerine from biodiesel production, alcohols from agricultural sources, biodiesel and biodigester gas. If the fuel is non-renewable, the power plant still potentially has zero atmospheric emissions and is carbon neutral in that any carbon in the fuel can be captured away from the atmosphere.

If the degree of reheat is modest or the fuel is a low-carbon fuel, the resulting CO2 levels in the heated steam may be sufficiently low to not impact the operation of the condenser 40 and related equipment. For instance, if saturated 800 psia steam is reheated from 518° F. to 800-1000° F. using natural gas, the CO2 content of the heated steam will be 0.9-1.5%. The resulting increase in power would be approximately 15-30%, including the additional auxiliary power required to produce the oxygen for the reheater 10.

Two possible sources 50 of the low-temperature steam for input into the reheater 10 are solar thermal and geothermal plants. Solar thermal plants typically produce only saturated steam as solar superheating is typically not a practical or cost-effective process. This may limit the use of the solar-derived steam as many steam turbines in the prior art are designed for steam with a certain level of superheat (typically at least 800° F.). Geothermal plants typically produce only moderately superheated steam due to the relatively low temperatures of the heat sources 50. Also, geothermal steam often contains non-condensable gases such as CO2, so the additional CO2 produced from combustion of a carbon-containing fuel will not greatly impact the operation of the reheater, turbine, condenser or other portions of the plant.

Other sources 50 of steam for the reheater 10 could be nuclear power plants (either the steam exiting the reactor or downstream of one of the turbines), combustion boiler Rankine cycle power plants including biomass fuel or fossil fuel combustion, taking the water either downstream of the boiler or downstream of one of the turbines 70. The turbine 20, 30 of this invention can be added to the power plant along with the reheater 10 or can be the turbine of the existing power plant, and the reheater is merely inserted upstream of the turbine 20, 30 to take full advantage of the turbine's maximum inlet temperature.

Figure 2:
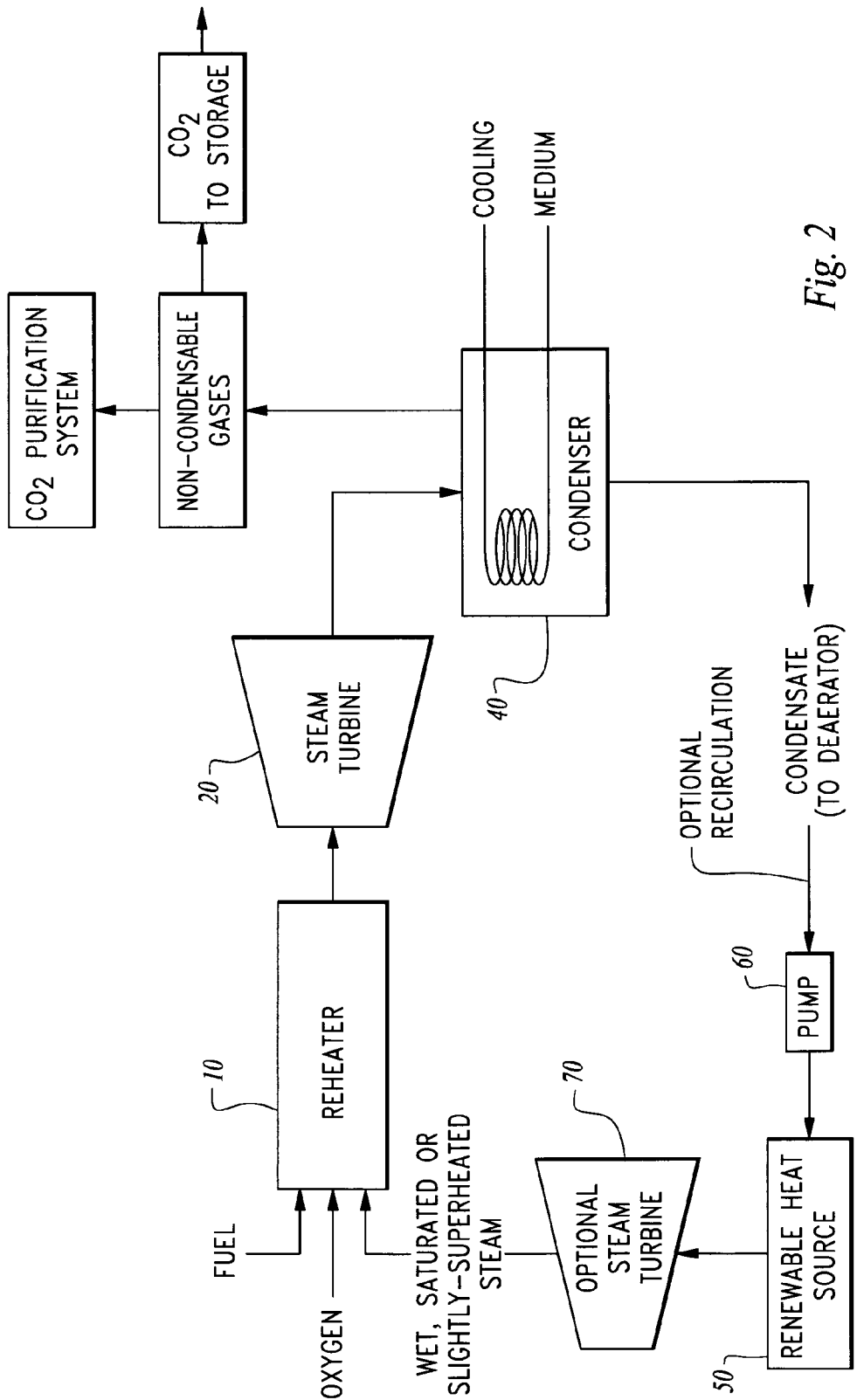
FIG. 2 is a schematic of an alternative reheat process to that depicted in FIG. 1 with the addition of carbon dioxide capture and storage away from the atmosphere.

A second embodiment, shown in FIG. 2, closely resembles the process in FIG. 1 with the exception that the CO2-rich non-condensable stream is conditioned and the CO2 delivered to a sequestration site such as an EOR (Enhanced Oil Recovery) field, saline aquifer or similar storage site.

This plant will emit negligible quantities of CO2 to the atmosphere (potentially even zero emissions) if the lower-temperature steam inputted into the reheater 10 is generated by a renewable heat source 50 such as a solar thermal plant or a geothermal reservoir. This will allow the solar or geothermal plant to retain its "carbon neutral" status after the reheat feature is incorporated. In fact, if the fuel used by the reheater 10 is also renewable, the overall cycle with reheat would remain carbon neutral without any CO2 sequestration (FIG. 1) and becomes "carbon negative" with CO2 sequestration; actually effectively removing carbon from the atmosphere and potentially reversing global warming due to carbon in the atmosphere while generating power.

Figure 3:
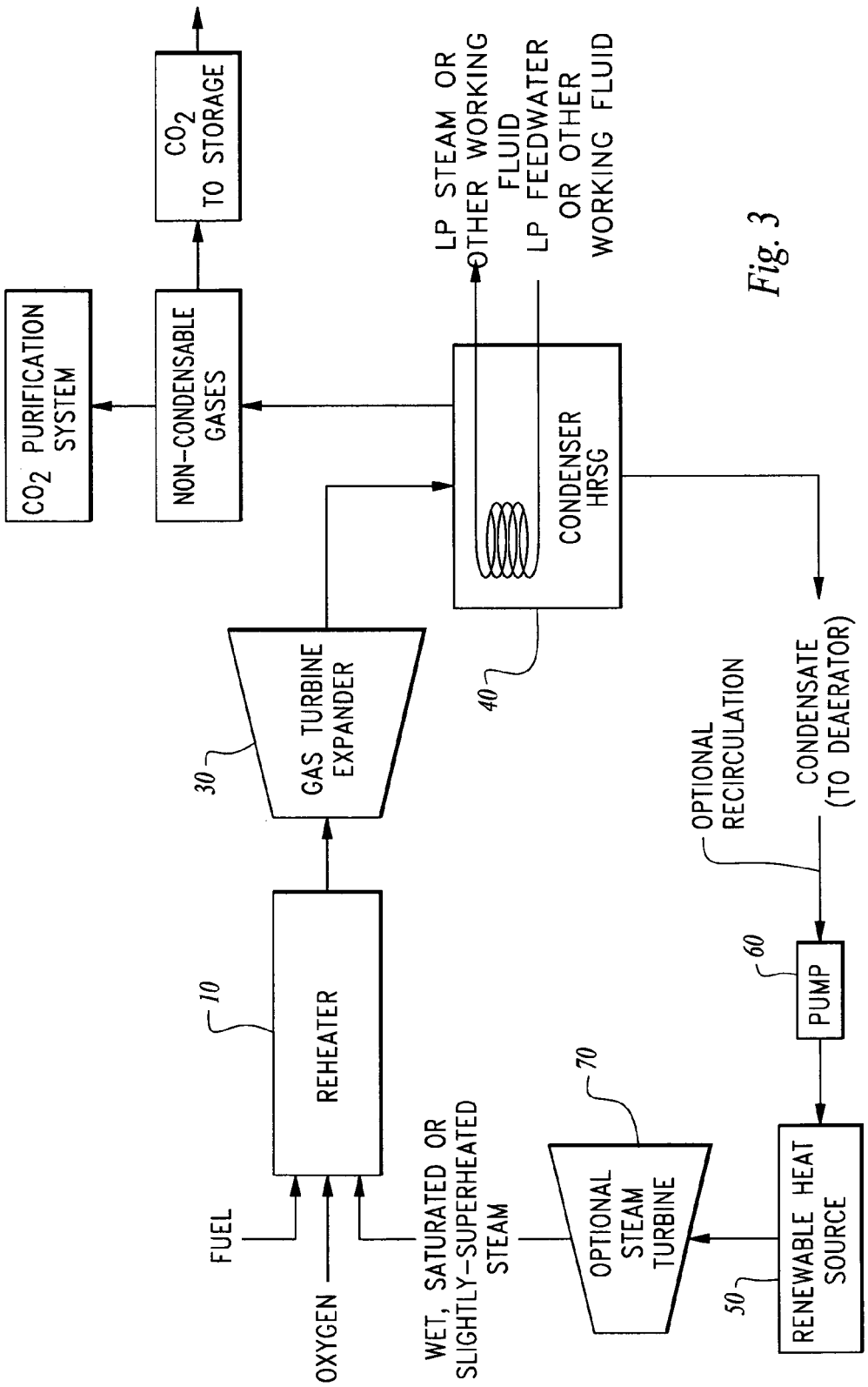
FIG. 3 is a schematic of a modified steam reheat process which utilizes a gas turbine expander rather than a steam turbine, and with the condenser in the form of a heat recovery steam generator that doubles as a carbon dioxide and water separator, and with the system also featuring carbon dioxide capture in this embodiment.

A third embodiment resembles that shown in FIG. 2, but rather than using a steam turbine 20, it includes a modified gas turbine 30 with a significantly higher inlet temperature, and a bottoming cycle. This third embodiment is shown in FIG. 3.

In this process, the gases leaving the reheater 10 enter a gas turbine 30 expander that has been modified for the steam/CO2 working fluid. This expander will have significantly higher inlet temperatures than a steam turbine (as high as 2000-2600° F. with state of the art gas turbines, or higher as the state of the art advances), enabling considerably more power to be generated at a high marginal efficiency. Oxyfuel combustion makes possible the generation of such a high temperature working fluid. The steam/CO2 exhaust from this turbine 30 can enter a condensing HRSG 40 (heat recovery steam generator) that raises low-pressure steam or boils some other working fluid in a bottoming cycle. The bottoming cycle can generate additional electric or shaft power through use of a turbine or other expander and/or can use the heat in a process, such that the plant becomes a cogeneration plant.

This embodiment could be deployed in plants that would like to see a significant increase in their power output without emitting CO2 to the atmosphere. Specific applications include the aforementioned solar thermal and geothermal plants, as well as biomass-fired plants that produce a source of intermediate-pressure steam either directly from the boiler or from the exhaust of a high-pressure steam turbine.

The use of an oxyfuel combustion reheater 10 in solar thermal, geothermal, and similar plants will augment the power produced by the plant. Because the reheat adds sensible heat at high temperature, the marginal efficiency of the additional power is high, typically 50% (LHV) assuming natural gas as the fuel and reheating steam from 518° F. to 800-1000° F. at 800 psia. Also, the higher steam turbine 20 inlet temperature will result in less condensation in the latter stages of the turbine at a given exhaust pressure (a benefit to reduce corrosion potential).

An additional benefit of the reheater is that it can smooth out uncertain or variable production from sources such as solar thermal or geothermal plants. In essence, when the solar or geothermal source wanes in output, the reheater can be increased in output to keep the turbine operating. For power plants with limited operating hours (or low load factors), such as solar thermal plants (that diminish or stop at sunset or when clouds are present), an added benefit of the oxyfuel combustion reheater concept is the fact that it has a relatively low capital cost due to its compact size, but can reliably increase operating hours for the power plant. This will have a positive impact on the cost-of-electricity, which is particularly sensitive to capital costs when load factors are low.

An additional benefit of the reheater 10 is that it can smooth out uncertain or variable production from sources such as solar thermal or geothermal plants. In essence, when the solar or geothermal source wanes in output, the reheater 10 can be increased in output to keep the turbine 20, 30 operating. For power plants with limited operating hours (or low load factors), such as solar thermal plants (that diminish or stop at sunset or when clouds are present), an added benefit of the oxyfuel combustion reheater 10 concept is the fact that it has a relatively low capital cost due to its compact size, but can reliably increase operating hours for the power plant. This will have a positive impact on the cost-of-electricity, which is particularly sensitive to capital costs when load factors are low.

Using a high-temperature gas turbine 30 will significantly augment the power production of the plant, as well as increasing the overall cycle efficiency. This may be an attractive option for biomass-fired plants that can raise steam at temperatures close to the current steam turbine limits of 1000-1050° F., but would like to increase their power output without emitting CO2 to the atmosphere and violating their carbon neutral status.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A system for enhancing the power output of a renewable heat source Rankine cycle power plant with little or no increase in emissions, the renewable heat source Rankine cycle power plant having a working fluid including water, the water being heated by a renewable source of heat within the Rankine cycle power plant, the system comprising in combination:

a reheater having a fuel inlet, an oxygen inlet and a steam inlet;

a source of fuel upstream of said fuel inlet, said source of fuel including a fuel combustible with oxygen to produce products of combustion including steam and/or carbon dioxide;

a source of oxygen upstream of said oxygen inlet, said source of oxygen including an oxidizer that is primarily oxygen;

said steam inlet located downstream from the renewable source of heat of said Rankine cycle power plant to receive steam after the steam has been heated by the renewable source of heat of the Rankine cycle power plant;

said reheater adapted to combust at least a portion of the fuel from said fuel inlet with at least a portion of the oxygen from said oxygen inlet to produce products of combustion including steam and/or carbon dioxide;

said reheater adapted to combine the products of combustion generated within said reheater with the steam from said steam inlet to generate a working fluid including steam;

said reheater including an outlet for the working fluid;

a turbine downstream of said outlet of said reheater, said turbine adapted to output power from the power plant;

wherein a condenser is provided downstream from said turbine, said condenser adapted to receive steam from said turbine and condense said steam into liquid water, said condenser including an outlet for the liquid water;

wherein said source of fuel includes a fuel containing carbon therein, with the products of combustion within said reheater including steam and carbon dioxide, the carbon dioxide within the products of combustion causing carbon dioxide to be contained within the working fluid leaving said outlet of said reheater, said condenser adapted to separate carbon dioxide in the working fluid from water within the working fluid, with the carbon dioxide being in a gaseous state when leaving said condenser and the water being in a liquid state when leaving said condenser; and wherein said water outlet of said condenser, including water previously routed from the renewable heat source and water originally generated in said reheater by combustion of the fuel with the oxygen, is recycled to the renewable heat source of the Rankine cycle power plant at least partially.

2. The system of claim 1 wherein said carbon dioxide outlet of said condenser is coupled to a carbon dioxide collection system adapted to collect carbon dioxide away from the atmosphere, such that carbon dioxide is not emitted into the atmosphere by said system.

3. The system of claim 1 wherein said turbine downstream of said outlet of said reheater is a steam turbine.

4. The system of claim 1 wherein said turbine downstream of said outlet of said reheater is a gas turbine, said gas turbine having an outlet temperature above a condensation temperature for water.

5. The system of claim 4 wherein a heat recovery steam generator is located downstream of said gas turbine, said heat recovery steam generator adapted to give up heat to a second working fluid sufficient to condense steam within the working fluid generated in said reheater, the heat recovery steam generator including a liquid water outlet.

6. The system of claim 5 wherein said second working fluid is coupled to an expander for further power output from said system, said heat recovery steam generator including a gaseous carbon dioxide outlet.

7. A method for enhancing the power output of a renewable solar radiation heat source Rankine cycle power plant with little or no increase in emissions, the renewable heat source Rankine cycle power plant having a working fluid including steam, the steam being heated by a renewable solar radiation source of heat, the method including the steps of:
providing a reheater, the reheater having a fuel inlet, an oxygen inlet and a steam inlet;
coupling a source of fuel to the reheater upstream of the fuel inlet, the source of fuel including a fuel combustible with oxygen to produce products of combustion including steam and/or carbon dioxide;
coupling a source of oxygen to the reheater upstream of the oxygen inlet of the reheater, the source of oxygen including an oxidizer that is primarily oxygen;
positioning the steam inlet to receive steam after the steam has been heated by the renewable source of heat of the Rankine cycle power plant;
combusting at least a portion of the fuel from the fuel inlet with at least a portion of the oxygen from the oxygen inlet within the reheater to produce products of combustion including steam and/or carbon dioxide;
combining the products of combustion within the reheater with the steam from the steam inlet to generate a working fluid including steam;
discharging the working fluid from an outlet of the reheater;
outputting power from a working fluid expander located downstream of the outlet of the reheater;
including the further steps of:
detecting when actual output from the renewable source of heat is below a preselected level due to clouds or sun position; and
adjusting a rate of reheater heat input to compensate for at least a portion of the deference between actual output of the renewable source of heat and the preselected level for the renewable source of heat.

8. The method of claim 7 wherein a steam turbine is located downstream of the steam in the Rankine cycle power plant and upstream of the steam inlet of the reheater, such that the steam passes through a turbine within the Rankine cycle power plant before the steam is routed to the reheater and to the turbine downstream of the output of the reheater, such that two separate turbines are provided at least partially in series with at least some of the steam passing through each of the turbines, and each of the turbines outputting power from the power plant.

9. The method of claim 7 including the further step of condensing at least a portion of the steam downstream of the turbine.

10. The method of claim 9 including the further step of configuring the source of fuel to include a fuel containing carbon therein, such that the products of combustion within the reheater include carbon dioxide and the working fluid includes carbon dioxide; and
separating the carbon dioxide in gaseous form from the water in liquid form downstream from the turbine.

11. The method of claim 10 including the further step of routing the water from said separating step back to the Rankine cycle power plant upstream of the source of heat.

12. The method of claim 10 wherein said separating step includes the step of collecting gaseous carbon dioxide separated from the water in the working fluid with the carbon dioxide collected at least partially away from the atmosphere, such that carbon emissions into the atmosphere are diminished.

13. A hybrid carbon neutral power generation system, comprising in combination:
a renewable source of heat adapted to heat a water containing working fluid;
a pump upstream of said renewable source of heat, said pump adapted to pump the water containing working fluid to a higher pressure before entering said renewable source of heat;
a reheater having a fuel inlet, an oxygen inlet and a water inlet;
a source of fuel upstream of said fuel inlet, said source of fuel including a fuel combustible with oxygen to produce products of combustion including steam and/or carbon dioxide;
a source of oxygen upstream of said oxygen inlet, said source of oxygen including an oxidizer that is primarily oxygen;
said water inlet of said reheater adapted to receive water downstream from said source of heat;
said reheater adapted to combust at least a portion of the fuel from said fuel inlet with at least a portion of the oxygen from said oxygen inlet to product products of combustion including steam and/or carbon dioxide;
said reheater adapted to combine the products of combustion therein with the water from said water inlet to generate a working fluid including steam;
said reheater including an outlet for the working fluid;
an expander downstream of said outlet of said reheater, said expander adapted to output power from the hybrid carbon neutral power generation system;
wherein said source of heat includes solar radiation; and
wherein said reheater is adapted to be increased in output by increasing flow rates of the fuel and the oxygen into said reheater to compensate for changes in output of said solar radiation source of heat, when clouds or sun position decrease solar heat output, said expander correspondingly outputting more power than without said reheater output increase.

14. The system of claim 13 wherein said source of heat includes geothermal heat.

15. The system of claim 13 wherein said source of heat includes combustion of a biomass fuel.

16. The system of claim 13 wherein a condenser is provided downstream from said expander, said condenser adapted to receive the working fluid from said expander and condense water in the working fluid into a liquid state, said condenser including an outlet for the liquid water.

17. The system of claim 16 wherein said water outlet of said condenser is recycled to the Rankine cycle power plant at least partially, upstream of said source of heat.

18. The system of claim 17 wherein said source of fuel includes a fuel containing carbon therein, with the products of combustion within said reheater including carbon dioxide, the carbon dioxide within the products of combustion causing carbon dioxide to be contained within the working fluid leaving said outlet of said reheater, said condenser adapted to separate carbon dioxide in the working fluid from water within the working fluid with the carbon dioxide being in a gaseous state when leaving said condenser and the water being in a liquid state when leaving said condenser.

19. The system of claim 18 wherein said carbon dioxide outlet of said condenser is coupled to a carbon dioxide collection system adapted to collect carbon dioxide away from the atmosphere, such that at least a portion of the carbon dioxide generated by the reheater is not emitted into the atmosphere by said system.

20. The system of claim 19 wherein said source of fuel is a source of renewable fuel, such that with the collection of carbon dioxide away from the atmosphere, power is generated while reversing global warming in the atmosphere.

21. The system of claim 20 wherein said source of fuel is taken from the group including: biomass, landfill gas, glycerine, alcohols, biodiesel and biodigester gas.

22. The system of claim 13 wherein said source of fuel is a source of renewable fuel, such that fully renewable power is generated by the system.

23. The system of claim 13 wherein said source of heat heats the water containing working fluid to a temperature up to about 800° F.

* * * * *